United States Patent
Jurawan

(10) Patent No.: US 9,306,604 B2
(45) Date of Patent: Apr. 5, 2016

(54) WEDGE SHAPED CORNER TRANSMITTER

(71) Applicant: Dennison Homer Jurawan, Kissimmee, FL (US)

(72) Inventor: Dennison Homer Jurawan, Kissimmee, FL (US)

( * ) Notice: Subject to any disclaimer, the term of this patent is extended or adjusted under 35 U.S.C. 154(b) by 13 days.

(21) Appl. No.: 14/338,067

(22) Filed: Jul. 22, 2014

(65) Prior Publication Data

US 2015/0031319 A1  Jan. 29, 2015

Related U.S. Application Data

(60) Provisional application No. 61/857,593, filed on Jul. 23, 2013.

(51) Int. Cl.
*H04B 1/00* (2006.01)
*H04B 1/03* (2006.01)

(52) U.S. Cl.
CPC ........................................ *H04B 1/03* (2013.01)

(58) Field of Classification Search
USPC .................. 455/128; 340/572.7, 572.8, 572.1; 343/819, 836, 837, 789, 786, 719
See application file for complete search history.

(56) References Cited

U.S. PATENT DOCUMENTS

| | | | | |
|---|---|---|---|---|
| 6,320,509 B1* | 11/2001 | Brady | ................. | B65D 25/205 340/572.7 |
| 7,187,341 B2* | 3/2007 | Lee | ........................ | H01Q 15/18 343/837 |
| 7,226,027 B1* | 6/2007 | Feeley | ................... | A47G 7/044 248/220.1 |
| 2001/0027661 A1* | 10/2001 | Nishikawa | ............ | F24F 1/0007 62/259.1 |
| 2002/0122006 A1* | 9/2002 | Crawford | ................. | H01Q 1/22 343/702 |
| 2003/0029975 A1* | 2/2003 | Cowan | ................... | F16M 13/02 248/220.1 |
| 2007/0229383 A1* | 10/2007 | Koyanagi | ............... | H01Q 1/243 343/793 |

* cited by examiner

*Primary Examiner* — Ganiyu A Hanidu

(57) ABSTRACT

A corner mounted device is provided. The corner mounted device includes a housing and a data transmitter within the housing. The housing may include a first rear surface, a second rear surface, and a front surface adjoining the first rear surface and the second rear surface, with an internal cavity formed in between. The housing may be in the form of a wedge shape. The first rear surface and the second rear surface may be substantially perpendicular relative to one another, and may thereby be secured to a corner of intersecting walls and/or ceiling.

4 Claims, 4 Drawing Sheets

WEDGE SHAPED CORNER TRANSMITTER

CROSS-REFERENCE TO RELATED APPLICATION

This application claims the benefit of priority of U.S. provisional application No. 61/857,593, filed Jul. 23, 2013, the contents of which are herein incorporated by reference.

BACKGROUND OF THE INVENTION

The present invention relates to an antenna for wireless broadcast and, more particularly, to a wedged shaped antenna form mounting in a corner of a room either vertically or horizontally.

A cellular repeater, cell phone repeater, or wireless cellular signal booster, a type of bi-directional amplifier (BDA) as commonly named in the wireless telecommunications industry, is a device used for boosting the cell phone reception to the local area by the usage of a reception antenna, a signal amplifier and an internal rebroadcast antenna. These are similar to the cellular broadcast towers used for broadcasting by the network providers, but are much smaller, usually intended for use inside buildings or wherever there is poor cellular coverage. Cellular repeater amplifiers are designed to rebroadcast the enhanced cellular signals inside a building. Currently, indoor wireless cellular communication antennas are typically installed in obtrusive locations within the buildings or space needing coverage.

As can be seen, there is a need for a device that facilitates the discrete mounting of an indoor antenna.

SUMMARY OF THE INVENTION

In one aspect of the present invention, a corner mounted device comprises: a housing comprising a first rear surface, a second rear surface, and a front surface adjoining the first rear surface and the second rear surface forming a substantially wedge shape, wherein an internal cavity is formed in between, wherein the first rear surface and the second rear surface are substantially perpendicular relative to one another and thereby formed to be secured to a corner of at least one of intersecting walls and a ceiling; and a data transmitter disposed within the internal cavity of the housing.

In another aspect of the present invention, a method of mounting a data transmitter comprises: providing a data transmitter with an external housing comprising a first rear surface, a second rear surface, and a front surface wherein the first rear surface and the second rear surface are substantially perpendicular relative to one another; and mounting the first rear surface to a first wall and the second rear surface to a second wall or ceiling near a corner where the first wall and the second wall or ceiling meet.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention may include a vertical or horizontal corner mounted transmitting antenna for wireless communication. The shape of the antenna of the present invention may allow the device to be mounted vertically in a corner between intersecting walls or horizontally in a corner between a wall and a ceiling. In certain embodiments, the present invention may further include a low passive intermodulation version for applications that may require stricter standards.

Figure 1:
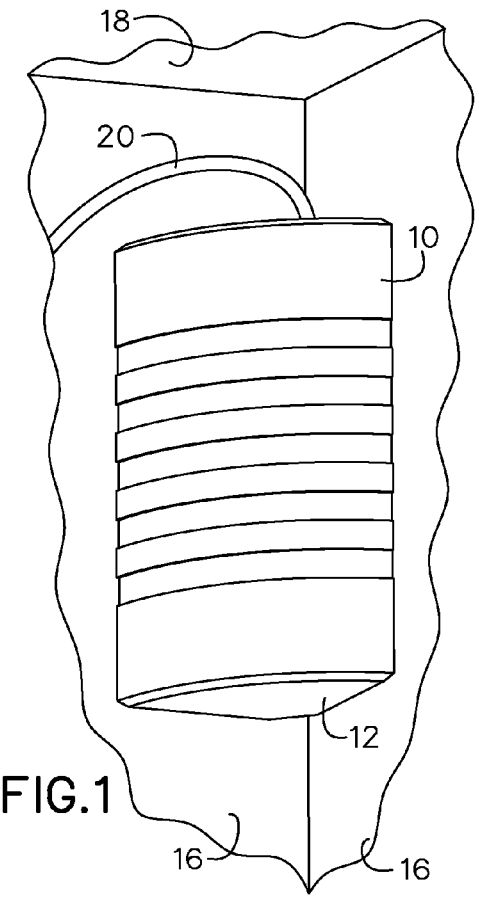
FIG. 1 is a perspective detail view of the present invention shown in use and attached to the corner of a wall and with an SMA Jack Connector oriented upward.
Figure 2:
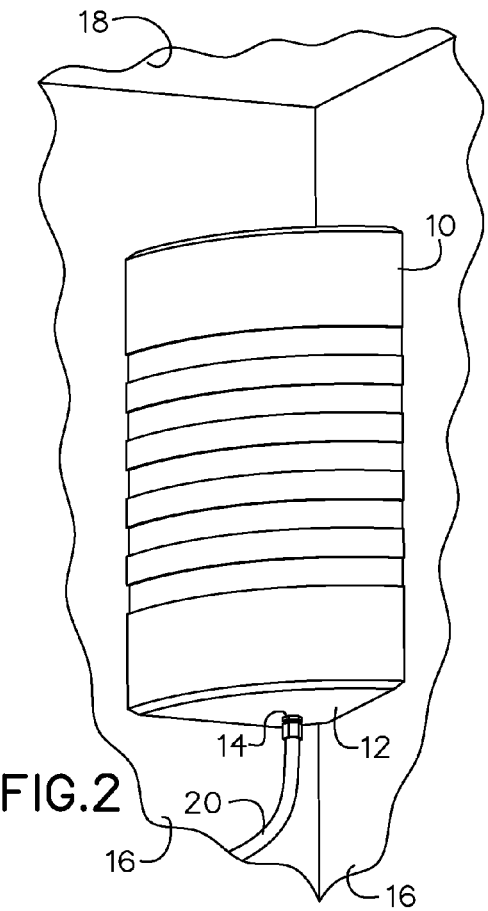
FIG. 2 is a perspective detail view of the present invention shown in use and attached to the corner of a wall and with an SMA Jack Connector oriented downward.
Figure 3:
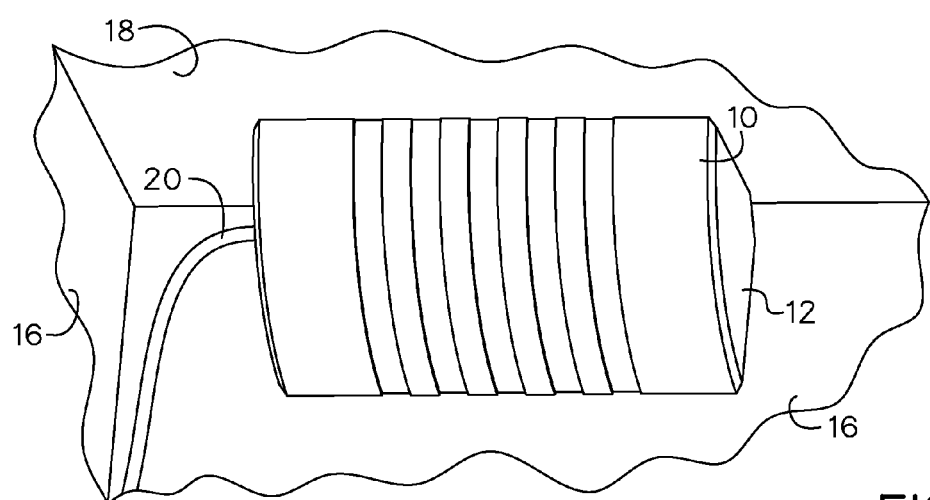
FIG. 3 is a perspective detail view of the invention shown in use and attached to a corner of a wall and ceiling.
Figure 4:
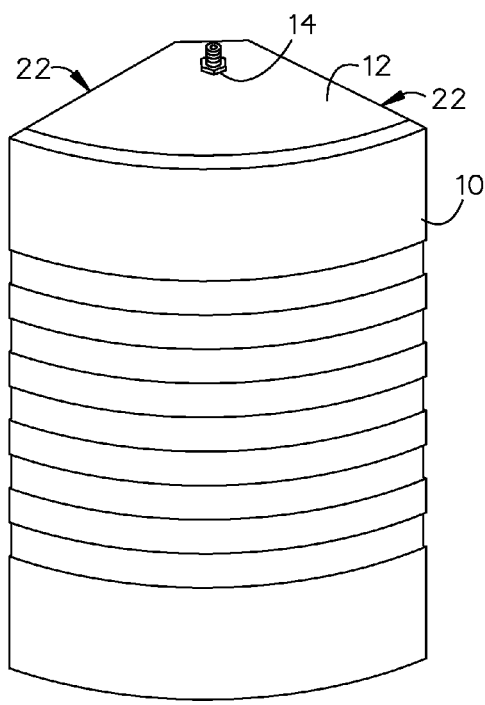
FIG. 4 is a front perspective view of the present invention.
Figure 5:
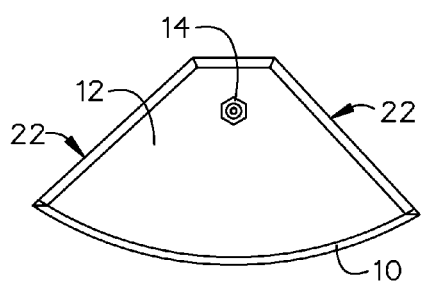
FIG. 5 is a rear perspective view of the present invention.
Figure 6:
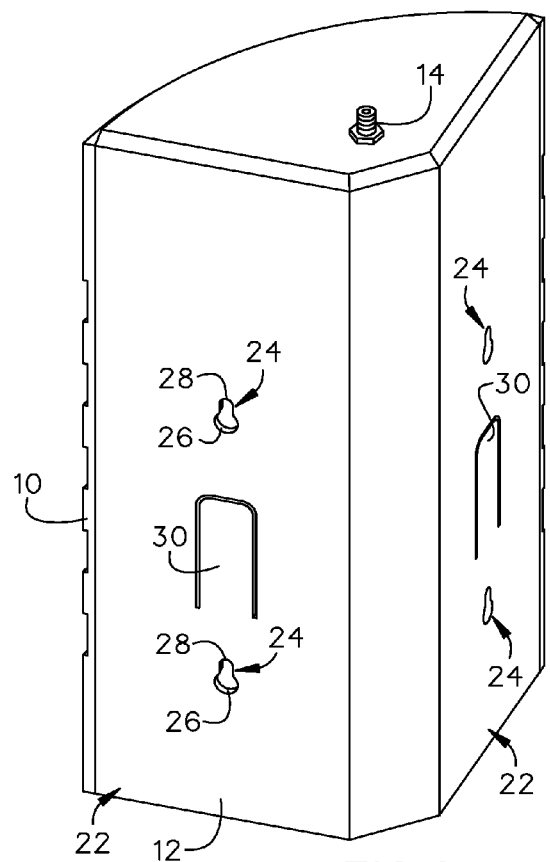
FIG. 6 is a top view of the present invention.
Figure 7:
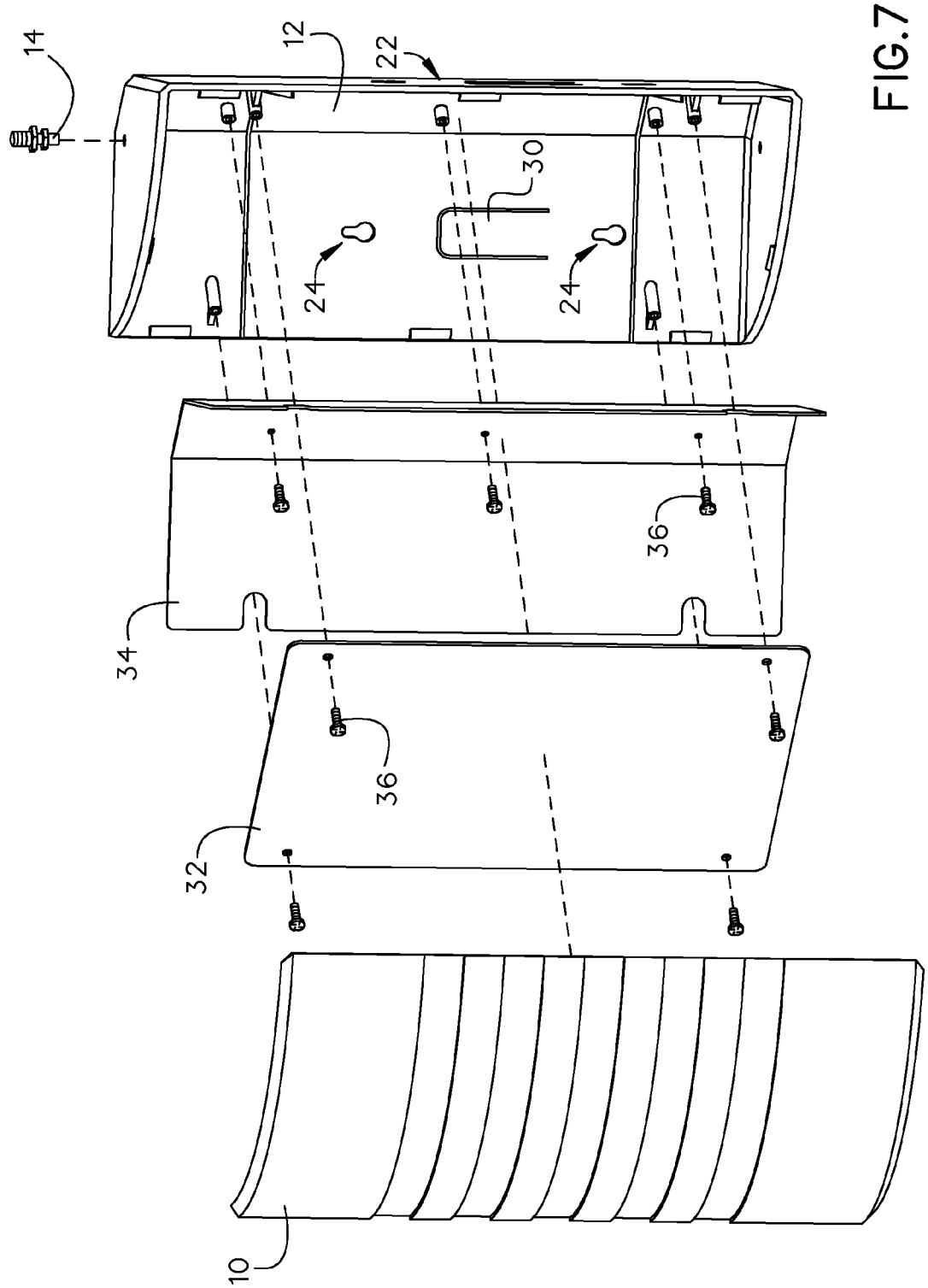
FIG. 7 is an exploded view of the present invention.
Figure 8:
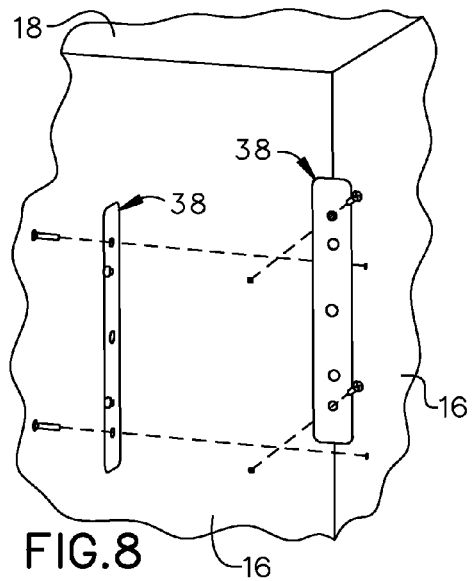
FIG. 8 is an exploded view demonstrating installation of brackets of the present invention.
Figure 9:
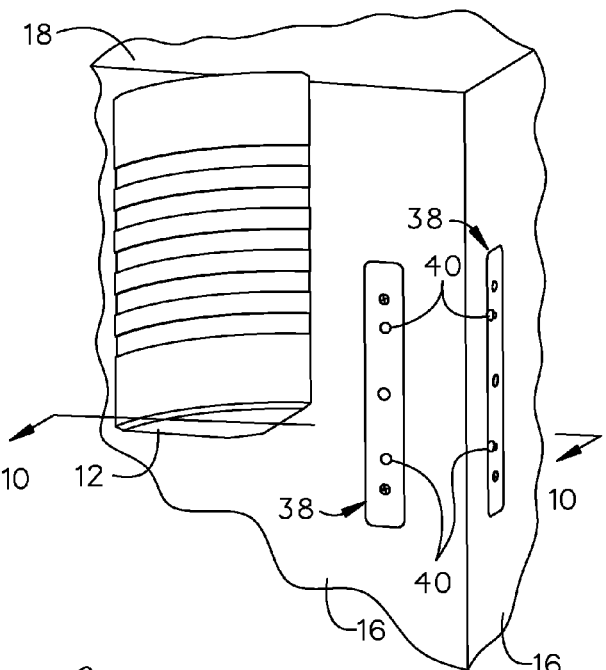
FIG. 9 is an exploded view of the present invention demonstrating installation onto the brackets.
Figure 10:
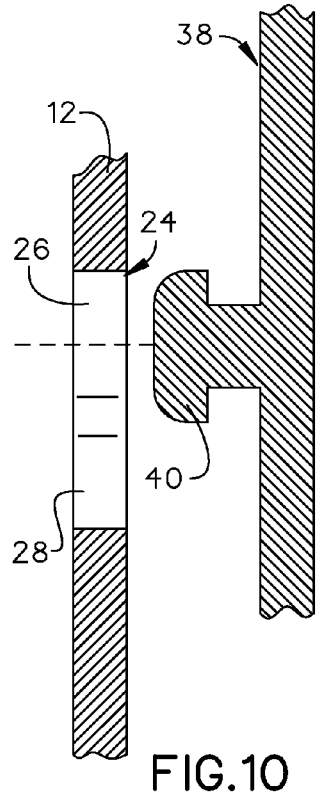
FIG. 10 is a section detail view along line 10-10 in FIG. 9.
Figure 11:
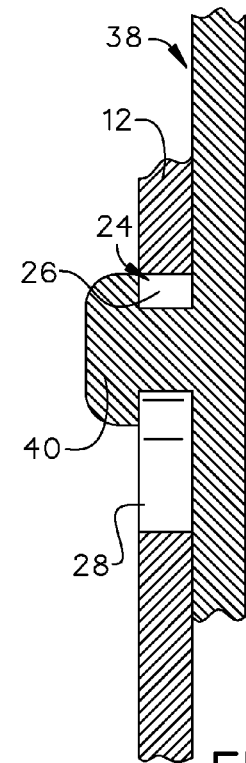
FIG. 11 is a section detail view of the attachment to the brackets of the present invention.
Figure 12:
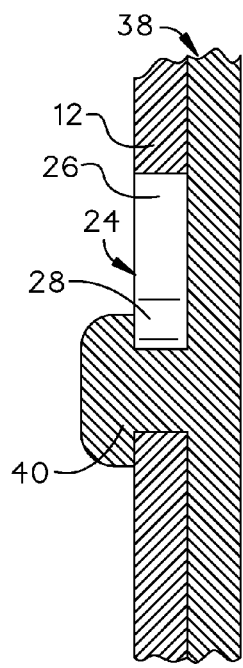
FIG. 12 is a section detail view of the attachment to the brackets of the present invention.

Referring now to FIGS. 1 through 12, the present invention includes a corner mounted device including a housing 12 and a data transmitter within the housing 12. The housing 12 may include a first rear surface 22, a second rear surface 22, and a front surface 10 adjoining the first rear surface 22 and the second rear surface 22, with an internal cavity formed in between. The housing 12 may be in the form of a wedged shape. The first rear surface 22 and the second rear surface 22 may be substantially perpendicular relative to one another, and may thereby be secured to a corner of intersecting walls 16 or a wall 16 and a ceiling 18.

As mentioned above, the housing 12 of the present invention may be shaped similar to a wedge. In certain embodiments, the first rear surface 22 and the second rear surface 22 may include a substantially similar width and height. In certain embodiments, the first rear surface 22 and the second rear surface 22 may be substantially flat, facilitating easy attachment to a corner of a room. Further, the front surface 10 may be curved from the first rear surface to the second rear surface. In certain embodiments, the housing 12 of the corner mounted device may be made of plastic, metal, or any suitable material. In certain embodiments, the housing 12 may be about 230 mm×130 mm×73 mm.

The data transmitter may include any mechanism used for transmitting data either wirelessly or wired. In certain embodiments, the data transmitter may be an internal wireless transmitting antenna, indoor wireless transmitter such as WiFi, and the like. In such embodiments, the housing 12 may include an Antenna PCB 32 as well as a metal reflecting plate 34. The Antenna PCB 32 and the metal reflecting plate 34 may be secured within the housing 12 by fasteners 36. In certain embodiments, an SMA jack connector 14 may protrude from the housing 12 and may be connected to a wire 20.

In certain embodiments, the housing 12 of the present invention may be mounted to a corner of a wall 16 and/or ceiling 18 by mounting brackets 38. In such embodiments, a first mounting bracket 38 may be attached to a first wall 16 by fasteners 36, and a second mounting bracket 38 may be attached to a second wall 16 or ceiling 18 adjacent to the first wall 16 by fasteners 36. The first rear surface 22 and the second rear surface 22 are attachable to the first mounting bracket and the second mounting bracket respectively, and thereby attaching the housing 12 to the corner of the wall 16 or ceiling 18.

In certain embodiments, the first rear surface 22 and the second rear surface 22 may each include a plurality of post slots 24. Further, the first and second rear surface 22 may include tongues 30. In certain embodiments, each of the post slots 24 may include a large diameter section 26 and a small diameter section 28. The first mounting bracket 38 and the second mounting bracket 38 may each include a plurality of bracket posts 40 formed to fit within the plurality of post slots 24. Each bracket posts 40 may include a shaft and a head wider than the shaft. The head may be inserted into the large diameter section 26 and the shaft may slide into the small diameter section 28, thereby locking the brackets 38 to the first and second rear surfaces 22.

A method of mounting a data transmitter may include the following. The data transmitter including an external housing is provided. The external housing includes a first rear surface, a second rear surface, and a front surface. The first rear surface and the second rear surface are substantially perpendicular relative to one another. The first rear surface and the second rear surface are mounted to a first wall and a second wall or ceiling near a corner where the first wall and the second wall or ceiling meet. The method may further include mounting a first bracket to the first wall and a second bracket to a second wall or ceiling near the corner. Then the first rear surface and the second rear surface are attached to the first bracket and the second bracket respectively.

A method of making the present invention may include the following. Design a mold in the form of the antenna housing. Once extruded, mount the internal back reflector and micro strip PCB with the external RF port. Bench test the antenna to ensure it meets predetermined specs. Make a mounting bracket for the antenna using metal. A method of using the present invention may include the following. By installing the antenna in a vertical or horizontal corner of the room to provide enhanced wireless cellular service, allowing the interfacing cable to take a discreet path.

It should be understood, of course, that the foregoing relates to exemplary embodiments of the invention and that modifications may be made without departing from the spirit and scope of the invention as set forth in the following claims.

What is claimed is:

1. A corner mounted device comprising:
   a housing comprising:
      a first rear surface having a front end and a rear end;
      a second rear surface having a front end and a rear end; and
      a front surface adjoining the front end of the first rear surface and the front end of the second rear surface and curving from the front end of the first rear surface to the front end of the second rear surface, wherein an internal cavity is formed in between, wherein
   the rear end of the first rear surface and the rear end of the second rear surface are joined together forming a wedge shape,
   at least one of the first rear surface and the second rear surface comprises at least one post slot formed therethrough;
   at least one mounting bracket configured to attach to at least one of a wall and a ceiling, wherein the mounting bracket comprises at least one post sized to mate with the at least one post slot; and
   a data transmitter disposed within the internal cavity of the housing.

2. The corner mounted device of claim 1, wherein the first rear surface and the second rear surface comprise substantially the same width and height.

3. The corner mounted device of claim 1, wherein the data transmitter is an internal wireless transmitting antenna.

4. The corner mounted bracket of claim 1, further comprising an SMA jack connector protruding from the housing.

\* \* \* \* \*